(12) United States Patent
Manorama et al.

(10) Patent No.: US 7,510,694 B2
(45) Date of Patent: Mar. 31, 2009

(54) PROCESS FOR SIMULTANEOUS PREPARATION OF NANOCRYSTALLINE ANATASE TITANIUM DIOXIDE POWDER AND HYDRAZINE MONOHYDROCHLORIDE

(75) Inventors: Sunkara Vardhireddy Manorama, Andhra Pradesh (IN); Kongara Madhusudan Reddy, Andhra Pradesh (IN); Pratyay Basak, Andhra Pradesh (IN); Chundayil Kalarickal Nisha, Andhra Pradesh (IN); Chada Venkata Gopal Reddy, Andhra Pradesh (IN)

(73) Assignee: Council of Scientific & Industrial Research, New Delhi (IN)

( * ) Notice: Subject to any disclaimer, the term of this patent is extended or adjusted under 35 U.S.C. 154(b) by 493 days.

(21) Appl. No.: 10/714,290

(22) Filed: Nov. 13, 2003

(65) Prior Publication Data

US 2005/0106095 A1    May 19, 2005

(51) Int. Cl.
*C01G 23/053* (2006.01)
*C01B 21/16* (2006.01)
(52) U.S. Cl. .................. 423/371; 423/610; 423/612

(58) Field of Classification Search .................. 423/610, 423/611, 612, 69, 351, 407, 481, 371
See application file for complete search history.

(56) References Cited

U.S. PATENT DOCUMENTS

2002/0051746 A1 * 5/2002 Okusako ..................... 423/610

OTHER PUBLICATIONS

K Madhusudan Reddy, (2002), Materials Chemistry and Physics, 78, 239-245.*
K Madhusudan Reddy, (2001), Journal of Solid State Chemistry, 158, 180-186.*

* cited by examiner

*Primary Examiner*—Wayne Langel
*Assistant Examiner*—James Fiorito
(74) *Attorney, Agent, or Firm*—Abelman, Frayne & Schwab

(57) ABSTRACT

The present invention relates to an environmentally benign process for the simultaneous preparation of nanocrystalline anatase titanium dioxide and hydrazine mohydrochloride, in substantial amounts from the acidic aqueous titanium tetrachloride solution by reacting with hydrazine monohydrate at ambient conditions of temperature and pressure. The process of the present invention is simple, easy to operate, pollution free, high in product purity and homogeneous in product particle.

9 Claims, 3 Drawing Sheets

PROCESS FOR SIMULTANEOUS PREPARATION OF NANOCRYSTALLINE ANATASE TITANIUM DIOXIDE POWDER AND HYDRAZINE MONOHYDROCHLORIDE

FIELD OF THE INVENTION

The present invention relates to an environmentally benign process for the simultaneous preparation of nanocrystalline anatase titanium dioxide and hydrazine monohydrochloride. In particular, the present invention relates to a process for the preparation of nanocrystalline anatase titanium dioxide and hydrazine monohydrochloride by reacting an aqueous solution of titanium tetrachloride taken in concentrated hydrochloric acid with hydrazine monohydrate under constant stirring at ambient temperature and pressure.

BACKGROUND OF THE INVENTION

Anatase titanium dioxide which is usually used as a photocatalyst removing environmental pollutants, as pigment material, additives for plastic product or for optical multicoating reagent. Titanium dioxide has mainly three polymorphic forms of crystalline structure, that is anatase, brookite and rutile. The performance of titanium dioxide in various applications depends on its crystalline phase state, dimensions and morphology. Titanium dioxide with anatase phase has been used as a photocatalyst in different organic reactions. It is also used in photovolatics because of its high photoactivity. Titanium dioxide shows different electrical characteristics according to the oxygen partial pressure since it has wide chemical stability and non-stoichiometric phase region. Because of this it can also be used as a humidity sensor.

Impact of nanostructure on the properties of high surface area materials is an area of increasing importance for understanding, creating and improving materials for diverse applications. The synthesis of nanoparticles with controlled size and composition is of technological interest. Reference may be made to the chloride process commercialized by Du Pont in USA in 1956 for preparation of titanium dioxide powders by the chloride process wherein titanium tetrachloride vigorously reacted with air undergoing hydrolysis at 1000° C. The inherent disadvantage of the process is the use of high temperature and costly equipments to control the reactant mixing ratios and less control on the particle shape and size. Reference may be made to the sulfate process which was industrialized Titan company in Norway in 1916 wherein titanium sulfate is conventionally hydrolyzed at temperatures higher than 95° C. The disadvantage is the post calcination at 800-1000° C. to obtain the titanium dioxide powder.

The other chemical methods to obtain titanium dioxide powders include (a) hydrolysis with ammonium hydroxide solution (b) sol-gel method (c) hydrothermal synthesis (d) hydrodynamic cavitation etc.

The hydrolysis method suffers from the limitation that it necessitates a post-calcination of the precipitates of hydroxides to obtain the respective oxides. Reference may be made to U.S. Pat. No. 5,030,439 wherein a method is described to prepare particulate anatase titanium dioxide by reacting titanium tetrahalide with sulfuric acid at 65-100° C. to first form titanyl sulfate which is subsequently crystallized then re-dissolved in water and hydrolyzed at 85-100° C. to form titanium dioxide. The inherent disadvantage is that it is a two step process requiring subsequent heat treatment.

The conventional sol-gel method involves metal alkoxides which requires tight control of reaction conditions since alkoxides are intensely hydrolyzed in air.

Furthermore, the high price of alkoxides limits the commercialization of this process. Reference may be made to JP 9-124, 320 wherein the gel was formed by adding water to titanium tetrachloride dissolved in alcohol together with various kinds of acetates, oxalates and citrates containing alkali metals or alkaline earth metals. The inherent disadvantage is the use of expensive additives such as organic acids and needs a high temperature treatment after gel formation.

The hydrothermal synthesis needs high temperature and pressure conditions and hence requires the use of an autoclave. All the above wet chemical routes however involve a heat treatment either during the processing or as a post-calcination step. Reference may be made to the work of Bruno (U.S. Pat. No. 5,973,175, 1999) wherein titanium dioxide is prepared from amino titanium oxalate precursor by hydrothermal process. Reference may be made to U.S. Pat. No. 4,954,476 wherein a method to prepare a catalyst containing titanium dioxide as a primary ingredient in a hydrothermal process with meta- or ortho-titanic acid as starting material has been described. The inherent disadvantage of all the processes is the high temperature and pressure requirement. Reference may also be made to U.S. Pat. No. 3,242,557 wherein a process is described to prepare pigmentary titanium dioxide by hydrothermal precipitation. The inherent disadvantage is that during the reaction, the reaction mixture is subjected to ultrasonic vibrations.

Attempts to synthesize nanoparticles of oxides in particular include the above said chemical routes. But the inherent disadvantages are in controlling the agglomeration and particle growth, which is mainly caused because of the involved heat treatment. Attempts to use hydrazine hydrate are concentrated in obtaining metal nanoparticles like Silver where hydrazine hydrate is used as a strong reducing agent.

Reference may be made to the work of Pileni et al *J. Phys. Chem.* 1993, 97, 12974, wherein silver nanoparticles were prepared by reducing silver sulfosuccinate solution by hydrazine hydrate.

Hydrazine monohydrate has been used earlier to synthesize oxides like ferrites where hydrazine is used to form an intermediate which decomposes by self-ignition or self propagating high temperature synthesis to obtain the ultra fine powders of ferrites. In this context, reference may be made to the publications of *Ravindranathan et. al J. Mat. Sci.*, 1986, 5, 221, wherein v-ferric oxide was prepared by thermal decomposition of hydrazine precursors in air around 200° C. Also reference may be made to the work by *Suresh et. al. J. Thermal Anal.*, 1989, 35, 1137 wherein Magnesium ferrite has been prepared by the thermal decomposition of a metal oxalate hydrazinate precursor. Reference may also be made to the work of Madhusudan Reddy et al., (*J. Solid Slate Chem.*, 2001, 158, 180 & *Mater. Chem. Phys.*, 2002, 78, 239) wherein hydrazine monohydrate is used with titanium tetrachloride to obtain anatase titanium dioxide nanoparticles with 5-15 nm. The inherent disadvantage is that the precipitate was air dried at 80-100° C. followed by heat treatment at 300-400° C.

The main difference in the procedure adopted by Madhusudan Reddy et al. (*J. Solid State Chem.*, 2001, 158, 180 and *Mater. Chem Phys.*, 2002, 78, 239) and the present invention for the synthesis of Nanoparticles of anatase titanium dioxide are the following:

1. Madhusudan Reddy et al obtained the crystalline Nanoparticles only after air drying the samples at 80-100° C. and then calcining at 300-400° C.

2. The Applicants' present conditions of temperature i.e., 20-40° C. and pressure around 1 atmosphere, and carrying out the reaction under nitrogen atmosphere; all of them result in Nanoparticles of anatase titanium dioxide unambiguously less than 5 nm; crystalline in nature with no heat treatment and calcinations.

Hydrazine monohydrochloride is a salt, which is obtained dissolved in the reaction medium, i.e., water. Freeze drying of the solution gives the salt in powder form. It is a deliquescent material hence the particle size cannot be obtained. However from XRD, the crystallite size can be estimated to be in the range of 15-20 nm.

The present invention discloses the preparation of nanocrystalline anatase titanium dioxide powder of particle size less than 5 nm reacting acidic aqueous titanium tetrachloride solution with hydrazine monohydrate at ambient reaction conditions in a single step without any subsequent heat treatment.

OBJECTS OF THE INVENTION

The main object of the present invention is to provide a convenient method for the preparation of nanocrystalline anatase titanium dioxide of particle size less than 1 to 5 nm in a single step process, which obviates the drawbacks as detailed above.

Another object of the present invention is to provide a method for the preparation of nanocrystalline anatase titanium dioxide powder at ambient conditions.

Yet another object of the present invention is to provide a method for the preparation of nanocrystalline anatase titanium dioxide powder without subjecting the reaction mixture to any heat treatment so as to prevent agglomeration.

Still another object of the present invention is to provide a process for the preparation of nanocrystalline anatase titanium dioxide powder of particle size less than 1 to 5 nm suitable for large scale preparation.

SUMMARY OF THE INVENTION

The novelty in the present invention is highlighted by the mechanism proposed for the formation of anatase titanium dioxide nanoparticles at room temperature from acidic aqueous titanium tetrachloride and hydrazine monohydrate. Hydrazine is a high energy compound having a positive heat of formation implying a high activity. The complete chemical equation for the process is formulated as:

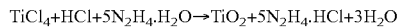
$$TiCl_4 + HCl + 5N_2H_4.H_2O \rightarrow TiO_2 + 5N_2H_4.HCl + 3H_2O$$

Thermodynamic calculations for the Gibb's free energy ($\Delta G°$) and heat of reaction ($\Delta H°$) for the above equation have been found to be negative. The former indicates that the reaction is thermodynamically favorable and the latter suggesting the reaction is exothermic. It is this exothermicity which is responsible for the formation of anatase titanium dioxide nanoparticles at room temperature via a hydrazine complex formation. Since the reaction is instantaneous there is no noticeable increase in temperature of the reaction mixture. On the basis of the above equation, gravimetric analysis of the reactants and products gives a complete material balance with the mismatch of theoretical and practical yield less than 5% which justifies the technique to be termed as a 'green route'.

DETAILED DESCRIPTION OF THE INVENTION

The present invention relates to an environmentally benign process for the simultaneous preparation of nanocrystalline anatase titanium dioxide and hydrazine monohydrochloride from the acidic aqueous titanium tetrachloride solution by reacting with hydrazine monohydrate to form a titanium dioxide precipitate directly at ambient conditions of temperature and pressure in air.

Accordingly, the invention provides an environmentally benign process for the simultaneous preparation of nanocrystalline anatase titanium dioxide and hydrazine monohydrochloride which comprises preparation of nanocrystalline anatase titanium dioxide of particle size less than 1 to 5 nm by reacting acidic aqueous titanium tetrachloride solution with hydrazine monohydrate at ambient conditions in air.

In an embodiment of the present invention, nanocrystalline anatase titanium dioxide is prepared by a process which comprises (a) preparation of aqueous solution of titanium tetrachloride taken in concentrated hydrochloric acid, (b) step of reacting the above acidic aqueous solution with hydrazine monohydrate under constant stirring at ambient conditions in air to obtain the anatase titanium dioxide as precipitate (c) step of obtaining the anatase titanium dioxide powder by filtering the above obtained precipitate, washing with distilled water and drying at room temperature and (d) step of obtaining the hydrazine monohydrochloride by freeze drying the filtrate and washings. In another embodiment of the present invention, nanocrystalline anatase titanium dioxide is prepared in aqueous solutions in the temperature range of 20 to 40° C.

In yet another embodiment of the present invention, aqueous solutions of 5 to 40% (v/v) of titanium tetrachloride is used.

In still another embodiment of the present invention, the preparation of nanocrystalline anatase titanium dioxide is completed by bringing the reaction pH to 7-8 by the addition of hydrazine monohydrate.

The following examples are given by way of illustration and therefore should not be construed to limit the scope of the present invention.

EXAMPLE-1

Preparation of Anatase Titanium Dioxide Nanoparticles

20% titanium tetrachloride solution was prepared in concentrated hydrochloric acid. Aqueous solution of titanium tetrachloride was then prepared by taking 2 ml of the above solution in 100 ml distilled water. To the above aqueous acidic solution hydrazine monohydrate (99%) was added in the range of 10 to 99% v/v dropwise under constant stirring at normal temperature 30° C. and about atm. pressure. The pH of the solution was brought to 7 and stirred further for 30 minutes to obtain the anatase titanium dioxide as precipitate. The titanium dioxide precipitate was filtered, washed with distilled water for 15 times and dried at normal temperature in air. The byproduct hydrazine monohydrochloride was recovered by freeze drying the filtrate and washing the filtrate with water at a temperature in the range of −60-40° C.

Figure 1:
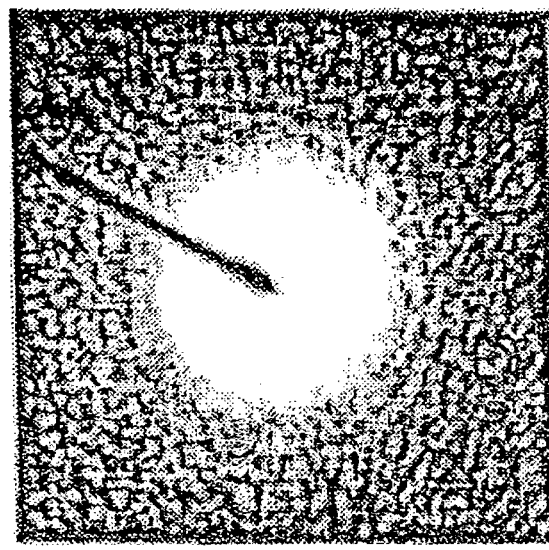
FIG. 1 is an electron diffraction pattern showing the formation of anatase titanium dioxide nanoparticles.

The formation of anatase titanium dioxide nanoparticles was confirmed from the selected area electron diffraction pattern (FIG. 1).

Figure 2:
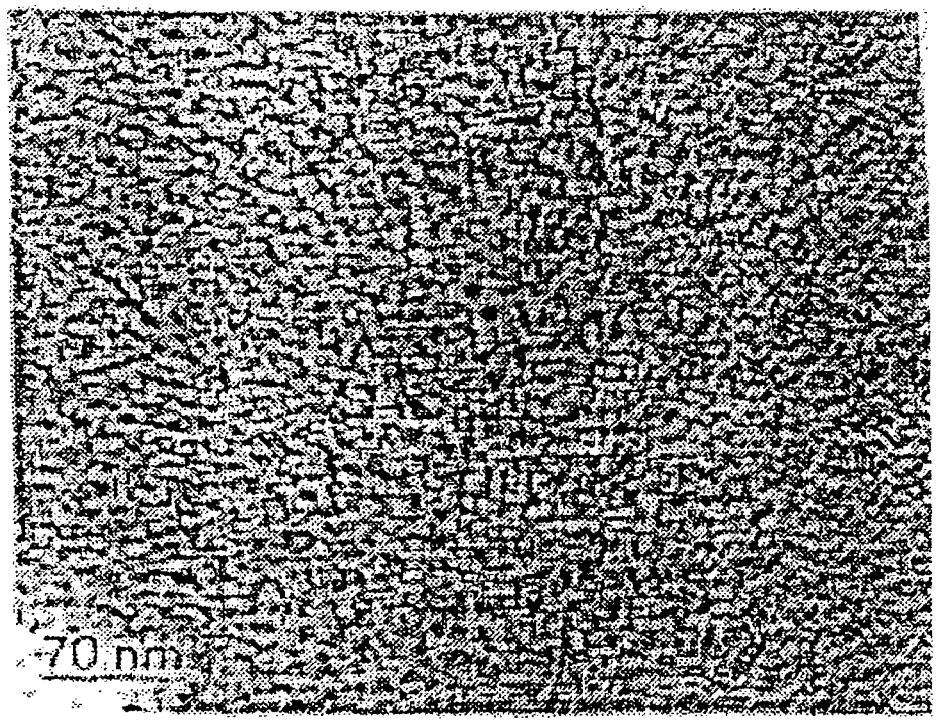
FIG. 2 shows that the particle size of titanium dioxide was found to be less than 3 nm from Transmission Electron Microscopy (TEM)

The particle size for titanium dioxide was found to be less than 3 nm using TEM (FIG. 2).

The BET surface area of the as prepared anatase titanium dioxide powder was found to be 245 m$^2$/g.

Figure 3:
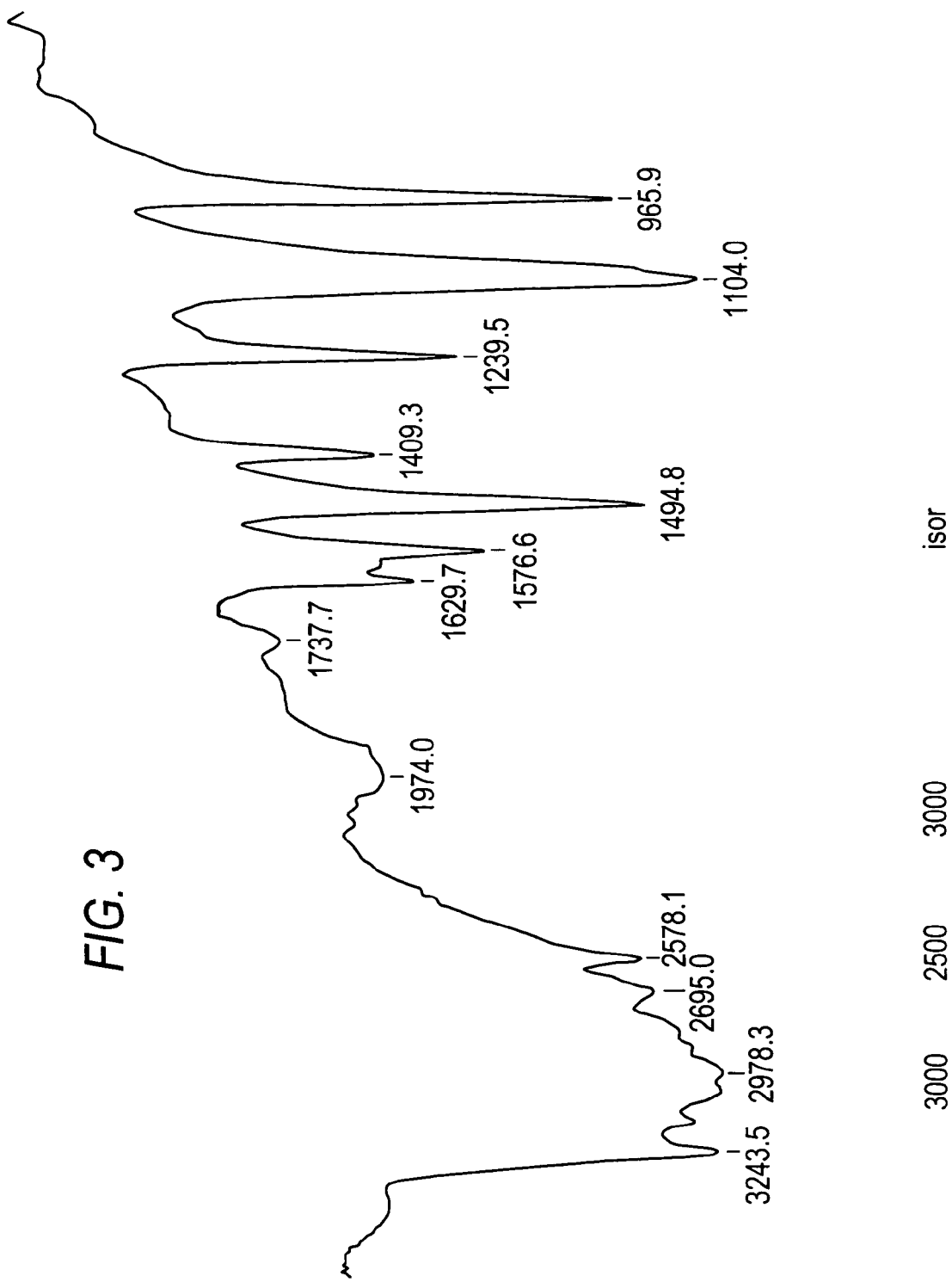
FIG. 3 provides data obtained from Fourier transform infra-red technique (FT-IR) which establishes that the by-product hydrazine monohydrochloride is recovered after filtering and washing.

The byproduct hydrazine monohydrochloride recovered by freeze drying the filtrate and washings was confirmed by FT-IR[(FIG. 3).

The yield for both the product and byproduct was better than 95%.

EXAMPLE-2

Preparation of Anatase Titanium Dioxide Nanoparticles

50% titanium tetrachloride solution was prepared in concentrated hydrochloric acid. Aqueous solution of titanium tetrachloride was then prepared by taking 2 ml of the above solution in 10 ml distilled water. To the above aqueous solution hydrazine monohydrate (99%) was added dropwise under constant stirring at 25° C. and about 1 atm. pressure. The pH of the solution was brought to 8 to obtain the anatase titanium dioxide as precipitate. The titanium dioxide precipitate was filtered, washed with distilled water for 10 times and dried at normal temperature in air. The byproduct; hydrazine monohydrochloride was recovered by freeze drying the filtrate and washings at −40° C.

The yield for both the product and byproduct was better than 95%.

Figure 4:
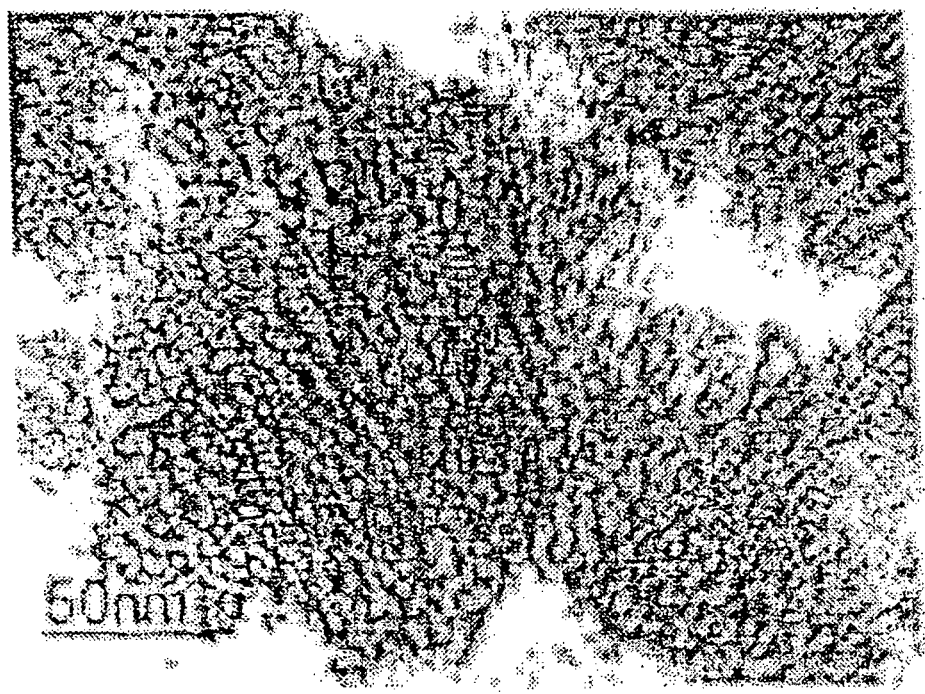
FIG. 4 shows that the particle size of titanium dioxide was found to be less than 5 nm from transmission electron microscopy (TEM); and, FIG. 5 shows that the particle size of titanium dioxide was found to be less than 5 nm using TEM.

The particle size for titanium dioxide was found to be less than 5 nm from TEM image (FIG. 4).

The BET surface area of the as prepared anatase titanium dioxide powder was found to be 210 m$^2$/g.

EXAMPLE-3

Preparation of Anatase Titanium Dioxide Nanoparticles

20% titanium tetrachloride solution was prepared in concentrated hydrochloric acid. Aqueous solution of titanium tetrachloride was then prepared by taking 1 ml of the above solution in 10 ml distilled water in a round-bottom flask and degassed for 30 minutes by nitrogen purging. To the above aqueous solution hydrazine monohydrate (99%) was added dropwise under nitrogen atmosphere and constant stirring at 30° C. and about 1 atm pressure. pH of the solution was brought to 7 to obtain the anatase titanium dioxide as precipitate. The titanium dioxide precipitate was filtered, washed with distilled water for 10 times and dried at normal temperature in air. The byproduct hydrazine monohydrochloride was recovered by freeze drying the filtrate and washings at −40° C.

The formation of anatase titanium dioxide nanoparticles was confirmed from the selected area electron diffraction pattern.

The yield for both the product and byproduct was better than 95%.

Figure 5:
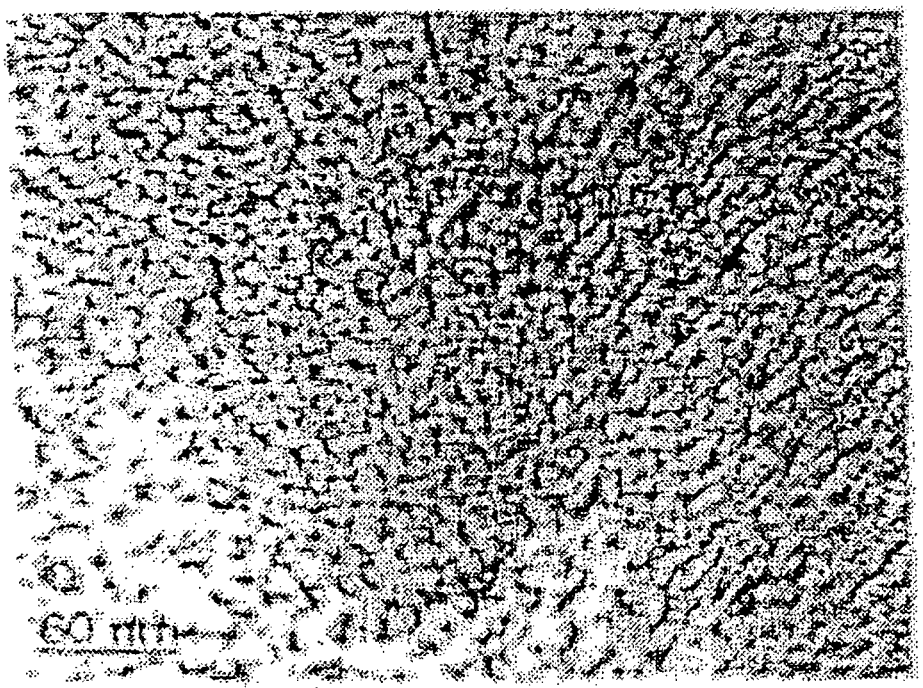

The particle size for titanium dioxide was found to be less than 5 nm using TEM (FIG. 5)/)

The BET surface area of the anatase titanium dioxide powder was found to be 232 m$^2$/g.

The main advantages of the present invention are:
1. It is an eco-friendly process for the preparation of nanocrystalline titanium dioxide in substantial amounts using hydrazine monohydrate.
2. It enables preparation of titanium dioxide nanoparticles in pure anatase form.
3. It is a single step process using commercially available titanium tetrachloride and hydrazine monohydrate without subsequent heating to higher temperatures.
4. It is suitable for large scale preparation of anatase titanium dioxide nanoparticles for commercial exploitation.

The invention claimed is:

1. An environmentally benign process for the simultaneous preparation of the nanocrystalline anatase titanium dioxide powder having particle size in the range of 1 to 5 nm and hydrazine monohydrochloride, said process comprising the steps of:
   (i.) adding hydrazine monohydrate solution dropwise to an acidic aqueous solution of titanium tetra chloride in a nitrogen atmosphere at a temperature in the range of 20 to 40° C. with constant stirring to form precipitate,
   (ii.) filtering the precipitate of step (i) to obtain titanium dioxide having a particle size in the range of 1 to 5 nm and optionally freeze drying and washing the filtrate to obtain hydrazine monohydrochloride.

2. The process as claimed in claim 1, wherein in step (i) the acidic aqueous solution of titanium tetrachloride contains TiCl$_4$ in the range of 5 to 40% v/v.

3. The process as claimed in claim 1, wherein in step (i), the hydrazine monohydrate solution contains hydrazine monohydrate in the range of 10 to 99% v/v.

4. The process as claimed in claim 1, wherein in step (i) the hydrazine monohydrate solution contains 99% v/v hydrazine monohydrate.

5. The process as claimed in claim 1, wherein the temperature is in the range of 20 to 40° C.

6. The process as claimed in claim 1, wherein in step (i) the pH of the mixture of hydrazine monohydrate solution and acidic aqueous solution of titanium tetrachloride is in the range of 7 to 8.

7. The process as claimed in claim 1, wherein the anatase titanium dioxide nanoparticles having a BET surface area in the range of 200 -250 m$^2$/gm are obtained.

8. The process as claimed in claim 1, wherein hydrazine monohydchioride obtained by freeze drying the filtrate and washing the filtrate with water at a temperature in the range of −60 to −40° C.

9. The process as claimed in claim 1, wherein the yield of anatase titanium dioxide and hydrazine monohydrochloride is above 95%.

* * * * *